United States Patent [19]

Nureki

[11] Patent Number: 5,029,327
[45] Date of Patent: Jul. 2, 1991

[54] OUTPUTTING APPARATUS FOR CHARACTERS AND GRAPHICS

[75] Inventor: Shinji Nureki, Tokyo, Japan

[73] Assignee: Seiko Instruments Inc., Japan

[21] Appl. No.: 477,630

[22] Filed: Feb. 9, 1990

[30] Foreign Application Priority Data

Feb. 9, 1989 [JP] Japan .................................. 1-30230

[51] Int. Cl.⁵ .......................................... G06K 15/00
[52] U.S. Cl. .................................. 364/519; 364/200; 364/243
[58] Field of Search ................... 364/518–523, 364/235 MS, 237.7 MS, 243 MS, 930 MS, 929.3 MS, 964 MS; 346/154; 400/61, 62, 65, 67, 68

[56] References Cited

U.S. PATENT DOCUMENTS 4,554,556  11/1985  Hirata et al. ................... 346/140 R
4,684,270  8/1987  Sakurai .............................. 400/121

Primary Examiner—Arthur G. Evans
Attorney, Agent, or Firm—Bruce L. Adams; Van C. Wilks

[57] ABSTRACT

In an outputting apparatus for characters and graphics such as a printer, in which data stored in an input buffer is being fetched one after another for analysis and output for printing, the present invention provides the installation of a new data string storage, and a data processing unit for storing a data string designated by a specific controlling code to the data string storage after fetching them from the input buffer and for reading out a data string designated by a specific controlling code from the data string storage. The present invention makes it possible to output for printing a data string stored in the data string storage only by inputting a specific controlling code, so that it improves the efficiency of data transfer.

2 Claims, 2 Drawing Sheets

OUTPUTTING APPARATUS FOR CHARACTERS AND GRAPHICS

BACKGROUND OF THE INVENTION

1. Field of the Invention

The present invention relates to an outputting apparatus for outputting characters and graphics such as printers, plotters or the like.

2. Description of the Prior Art

Conventional outputting apparatus for outputting characters and graphics such as printers and plotters is composed of an input buffer for temporarily storing data inputted from outside, a data processing unit for sequentially fetching data from the input buffer, separating them into controlling codes and data for characters and graphics and analyzing them, and an outputting unit for displaying or printing characters and graphics in accordance with output signals outputted from the data processing unit.

The input buffer is simply a storage for temporarily storing inputted data. As a result, such data as stored in the input buffer are lost once they were fetched for processing. Therefore, it becomes necessary to input anew data strings consisting of the same characters, graphic data, controlling codes and others at each time when the same character strings and graphics previously inputted should repeatedly be used for outputting.

In a system such as POS and information terminals which require repeated outputs of the same character strings and graphics, the load on the side of its host system to transfer data becomes greater because the data strings having exactly the same characters, graphics data, controlling codes and others are inputted as required at each time, and the processing efficiency of the host system is lowered.

Also, if the speed with which data are transferred from a host system to the outputting apparatus is slower than the outputting speed of the outputting apparatus, a longer period of time is required for the data transfer, and the utilization efficiency of the outputting apparatus for outputting characters and graphics is lowered.

SUMMARY OF THE INVENTION

An object of the present invention is to provide an outputting apparatus for outputting characters and graphics which is able to minimize an amount of data transferred from a host system.

Another object of the present invention is to provide an outputting apparatus for outputting characters and graphics which improves on the processing efficiency of the host system and the utilization efficiency of the outputting apparatus simultaneously.

To realize above objects, the outputting apparatus of the present invention comprises an input buffer for storing temporarily string data inputted from the host system, a data string storage for memorizing data strings consisting of character data, graphics data, controlling codes and others, an outputting unit for displaying or printing characters and graphics in accordance with outputting signals outputted from a data processing unit and the data processing unit for sequentially fetching data from the input buffer, analyzing them and processing them according as the result of the analysis.

According to the present invention the data string inputted from the host system consist of characters, graphics, controlling codes and others. The controlling codes have a write controlling code to write designated data strings in the data string storage and a read controlling code to read designated data strings from the data string storage.

The data string storage can be made up of RAM and a disk unit or of ROM in which character strings, graphic data and others are written in advance.

The outputting apparatus of the present invention can enter up the data strings, which are transferred frequently from the host system to the outputting apparatus, in the data string storage with the write controlling code. The data strings stored in the data string storage are reusable repeatedly if only they are designated for use by the read controlling code. Consequently, the more the same data should repeatedly be used, the transferring amount of data between the host system and the outputting apparatus becomes less.

DESCRIPTION OF THE PREFERRED EMBODIMENT

The invention will now be described with reference to the accompanying drawing representing and embodiment thereof.

Figure 1:
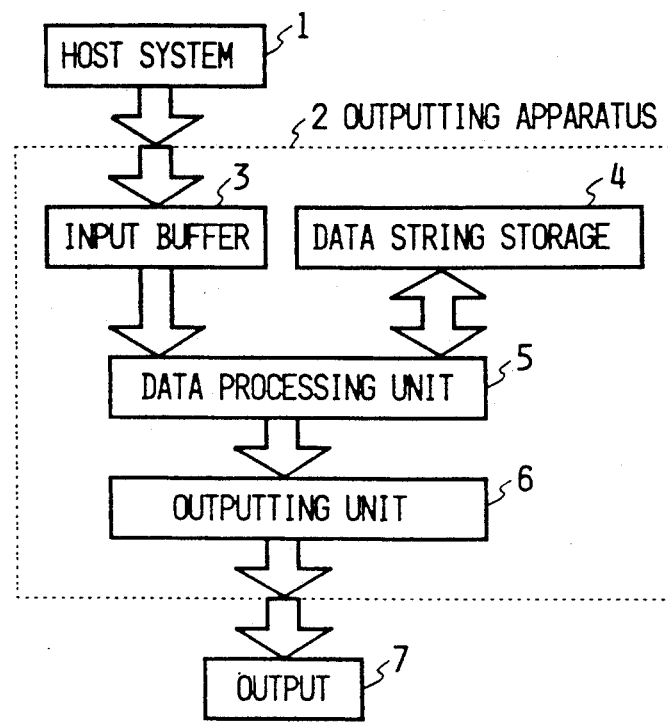
FIG. 1 is a block diagram illustrating the present invention.

FIG. 1 is a block diagram illustrating the present invention.

An outputting apparatus 2 has an input buffer 3, a data string storage 4, a data processing unit 5 and an outputting unit 6, receives data inputted from a host system and outputs an output 7 in accordance with the data.

The data processing unit 5 is a controlling circuit formed by a microcomputer, controls the input buffer 3 and the data string storage 4 formed by a memory, and outputs outputting signals to the outputting unit 6.

The outputting unit 6 can be made up a driving circuit, a controlling circuit and a liquid crystal display panel or a thermal head array or other, and outputs characters and graphics in accordance with outputting signals.

The data inputted from the host system 1 includes characters codes, graphics, controlling codes and others. The controlling codes have a write controlling code, which orders designated data strings to write in the data string storage 4, and a read controlling code, which orders designated data strings to read out from the data string storage 4.

The data outputted from the host system 1 are temporarily stored in the input buffer 3.

The data processing unit 5 fetches a data from the input buffer 3 for analysis one after another. If the data thus fetches are characters or graphics, it sends outputting signals in accordance with the data to the outputting unit 6. And the outputting unit 6 prints out or displays characters or graphics according as outputting signals. If the data thus fetched are the controlling code, it processes the data according to such data.

In the case of a data fetched by the data processing unit 5 from the input buffer 3 being the write controlling code, the data processing unit 5 writes assigned data string into the data string storage 4 after having fetched such assigned data string from the input buffer 3.

Also, in the case of a data fetched by the data processing unit 5 from the input buffer 3 being the read controlling code, the data processing unit 5 fetches a data from the assigned data string of the data string storage 4 one after another, and processes them exactly in the same manner as it fetches data directly from the input buffer 3.

Figure 2:
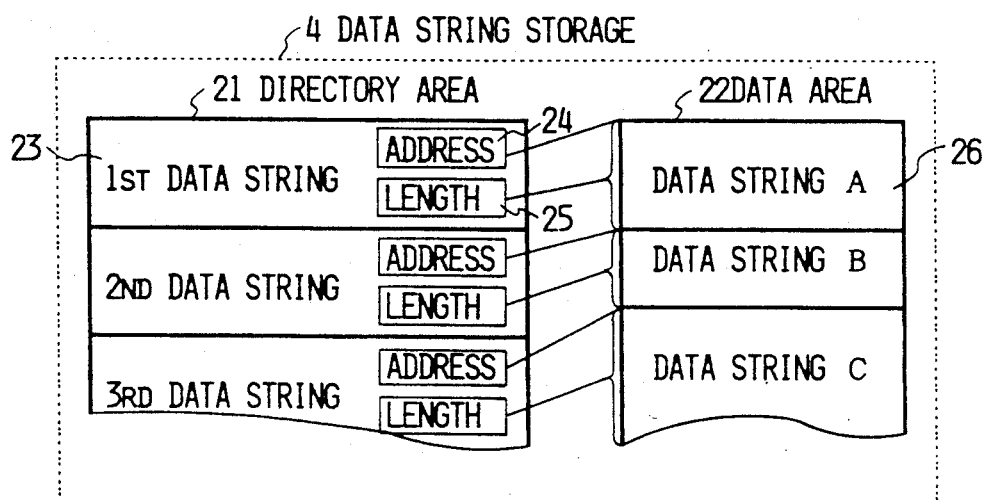
FIG. 2 is a block diagram illustrating a data string storage of the present invention.

FIG. 2 is a block diagram illustrating a data string storage of the present invention.

The data string storage 4 can be RAM or a disk device, and has a data area 22 in where one data string or more can be stored and a directory area 21 in where the first address and length of each of the data strings are stored. An address 24 and a length 25 stored in a 1st data string of the directory area 21 are equivalent to first address and length of data string A 26 stored in the data area 22.

The data string inputted from the host system 1 is a string of data and each data consists of one byte code which represents character, graphics, a write controlling code, a read controlling code, a carriage return (CR), a reductive command, a magnifying command or others.

Figure 3:
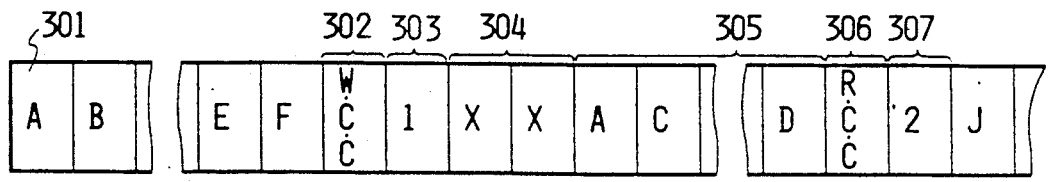
FIG. 3 is a schematic representation illustrating a preferred data string format which may be employed by the present invention.
Figure 4:
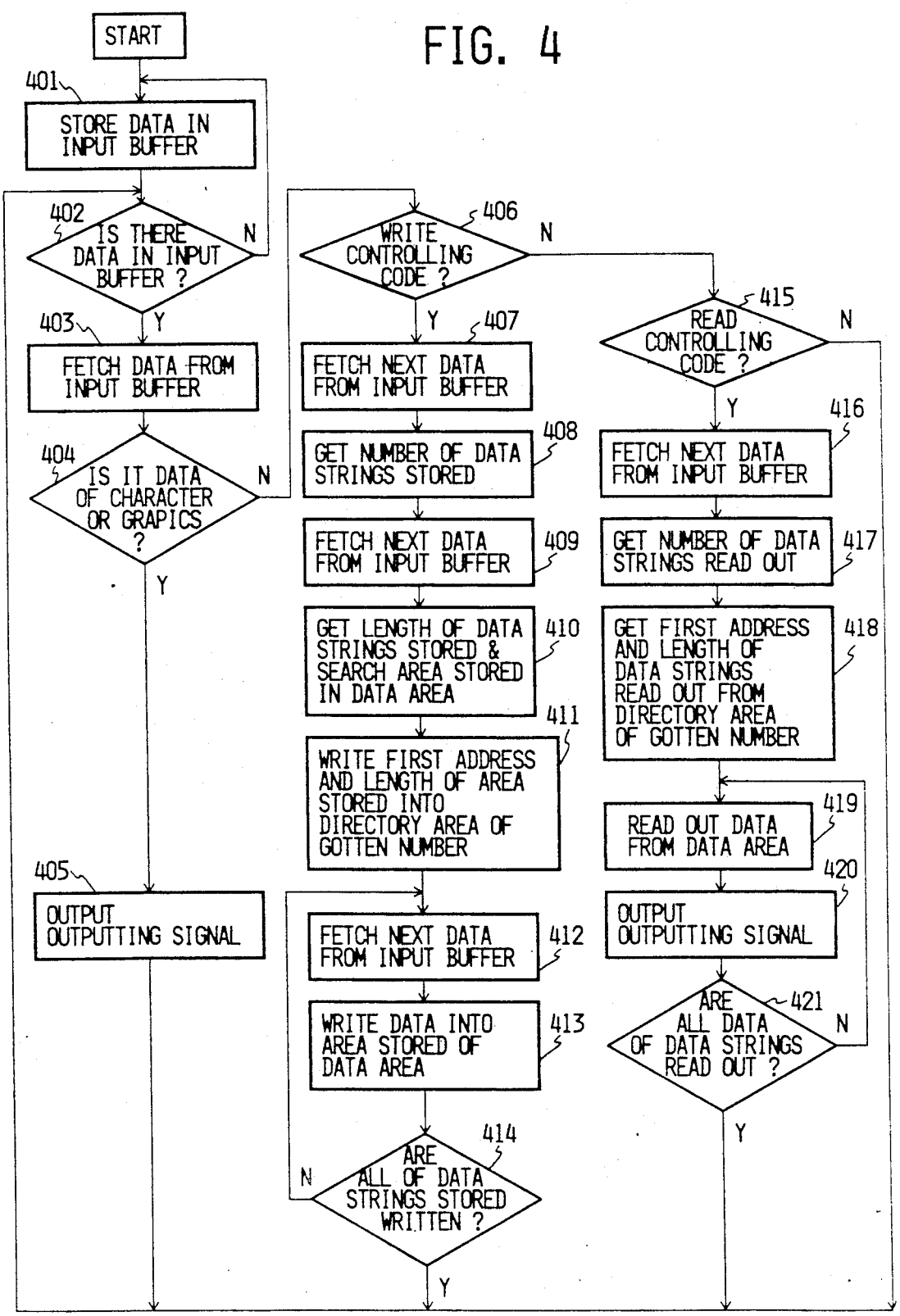
FIG. 4 is a flow sheet of assistance in explaining the operation of the present invention.

For illustration of the invention, we explain the operation of the present invention according to an exemplary data string shown in FIG. 3 and a flow sheet shown in FIG. 4.

Firstly, the host system 1 sends data to the outputting apparatus 2 one after another and the data are stored in the input buffer temporarily (step 401).

The data processing unit 5 judges whether the input buffer 3 has the data (step 402). When the input buffer 3 has not the data, the data processing unit 5 orders the host system 1 to send the data. When the input buffer 3 has the data, step 403 is executed and the input buffer 3 loses a fetched data.

Next, the data processing unit 5 judges whether the fetched data is data of character or graphics (step 404). When the fetched data is data of character or graphics, the data processing unit 5 outputs an outputting signal in accordance with the fetched data to the outputting unit 6 (step 405) and returns to step 403 for fetching a next data from the input buffer 3.

In this process, characters of A, B, . . . , E and F are outputted from the outputting unit 6 one after another.

When the fetched data is the controlling code, the data processing unit 5 judges whether the fetched data is the write controlling code (W.C.C.) 302.

When the fetched data is the write controlling code, step 407 is executed and the data processing unit 5 gets the number of the data string stored (step 408). Further, step 409 is executed and the data processing unit 5 gets the length of the data string stored from the fetched data and searches a area stored in the data area 22 of the data string storage 4 (step 410).

And the data processing unit 5 writes a first address and the length of the area stored into a directory area 21 of the gotten number of the data string stored (step 411).

Furthermore, step 412 is executed and the fetched data is written into the area stored of the data area 22 (step 413). And the data processing unit 5 judges whether all of the data string stored are written (step 414). When all of the data string stored are not written, its process returns to step 412 for processing the remaining data. When all of the data string stored are written, its process returns to step 401 for processing next data.

In this process, the data string which consists of A, C, . . . and D 305 are written into the data area 22 for the data string A, and the first address and the length 304 of the data string A are written into the address 24 and the length 25 of 1st data string 23 of the directory area 21.

In step 406, if the fetched data is not he write controlling code, step 415 is executed. When the fetched data is not a read controlling code (R.C.C.) 306, its process returns to step 402 for processing the next data. When the fetched data is the read controlling code 306, step 416 is executed and the data processing unit 5 gets a number of a data string read out 307 (step 417). The data processing unit 5 gets the first address and the length of the data string read out from the directory area 21 of the gotten number "2" (step 418). Further, the data processing unit 5 reads out a first data from a data string B corresponding to the gotten number "2" (step 419) and outputs an outputting signal in accordance with the read out data to the outputting unit 6 (step 420). Furthermore, the data processing unit 5 judges whether all of the data string B are read out (step 421). When all of the data string B are not read out, its process returns to step 419 for processing the remaining data. In this manner, each data of the data string B is processed one after another and the data string B is outputted. When all of the data string B are read out, its process returns to step 402 for processing the next data.

Lastly, the data which represents the carriage return, the reductive command, the magnifying command or others is processed in the same manner as the data of character or graphics was processed and is stored for a part of the data string in the data string storage.

As set forth above, according to the present invention, the transferring amount of data between the host system 1 and the outputting apparatus 2 can be reduced, and the processing efficiency of the host system 1 and the utilization efficiency of the outputting apparatus 2 can be improved.

What is claimed is:

1. An outputting apparatus for outputting characters and graphics transferred from a host system, the outputting apparatus comprising:

first memory means for storing data string transferred from said host system;

second memory means for storing data string;

data processing means having means for fetching data of said data string stored in said first memory means one after another, means for judging whether said fetched data is a write/read controlling code, means for entering up said data string stored in said first memory means designated by said write controlling code in said second memory means when said fetched data is said write controlling code, means for reading out said data string stored in said second memory means designated by said read controlling code when said fetched data is said read controlling code, and means for generating an outputting signal for outputting said fetched data and said read out data; and outputting means for outputting characters and/or graphics according to said outputting signal.

2. The outputting apparatus claimed in claim 1; wherein said second memory means comprises a data area for storing said data string stored in said first memory means designated by said write controlling code and a directory area for storing a number, a first address and a length of said data string stored in said data area.

* * * * *